United States Patent
Spangler (10) Patent No.: US 10,544,682 B2
(45) Date of Patent: Jan. 28, 2020

(54) EXPANSION SEALS FOR AIRFOILS

(71) Applicant: United Technologies Corporation, Farmington, CT (US)

(72) Inventor: Brandon W. Spangler, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 47 days.

(21) Appl. No.: 15/675,899

(22) Filed: Aug. 14, 2017

(65) Prior Publication Data

US 2019/0048726 A1    Feb. 14, 2019

(51) Int. Cl.

| F01D 5/14 | (2006.01) |
| F01D 5/18 | (2006.01) |
| F01D 9/04 | (2006.01) |
| F01D 5/28 | (2006.01) |
| F01D 25/12 | (2006.01) |
| F01D 25/00 | (2006.01) |

(52) U.S. Cl.
CPC .............. *F01D 5/147* (2013.01); *F01D 5/187* (2013.01); *F01D 5/282* (2013.01); *F01D 5/284* (2013.01); *F01D 9/041* (2013.01); *F01D 25/005* (2013.01); *F01D 25/12* (2013.01); *F05D 2220/32* (2013.01); *F05D 2230/232* (2013.01); *F05D 2230/60* (2013.01); *F05D 2240/55* (2013.01); *F05D 2260/20* (2013.01); *F05D 2300/175* (2013.01); *F05D 2300/6033* (2013.01)

(58) Field of Classification Search
CPC .......... F01D 5/189; F01D 5/147; F01D 5/188; F01D 25/12; F01D 5/18; F01D 5/282; F05D 2260/201; F05D 2220/32; F05D 2260/22141
See application file for complete search history.

(56) References Cited

U.S. PATENT DOCUMENTS

| 3,095,180 A | 6/1963 | Clarke et al. |
| 3,369,792 A | 2/1968 | Henry et al. |

(Continued)

FOREIGN PATENT DOCUMENTS

| EP | 3323979 A1 | 5/2018 |
| GB | 1078116 | 8/1967 |

(Continued)

OTHER PUBLICATIONS

European Search Report for Application No. 18189024.5 dated Nov. 6, 2018, 10 Pages.

*Primary Examiner* — Long T Tran
(74) *Attorney, Agent, or Firm* — Cantor Colburn LLP (57) ABSTRACT

Airfoils and methods of making the same, the airfoils having an airfoil body radially extending from a first end to a second end and axially extending from a leading edge to a trailing edge, the airfoil body defining an airfoil cavity therein, the airfoil cavity defined by a cavity wall having at least one smooth portion, at least one expansion seal installed within the airfoil cavity, the at least one expansion seal dividing the airfoil cavity into at least a first sub-cavity and a second sub-cavity, wherein the at least one expansion seal engages with the smooth portion of the cavity wall by an expansion force that biases ends of the at least one expansion seal into contact with the smooth portion of the cavity wall.

17 Claims, 7 Drawing Sheets

(56) References Cited

U.S. PATENT DOCUMENTS

| | | | |
|---|---|---|---|
| 4,026,659 A * | 5/1977 | Freeman, Jr. | F01D 5/186 415/115 |
| 4,153,386 A * | 5/1979 | Leogrande | F01D 5/188 415/115 |
| 4,461,612 A * | 7/1984 | Dodd | F01D 5/186 415/115 |
| 5,356,264 A | 10/1994 | Watson et al. | |
| 5,516,260 A * | 5/1996 | Damlis | F01D 5/189 415/115 |
| 6,238,183 B1 | 5/2001 | Williamson et al. | |
| 6,419,449 B2 | 7/2002 | Ferber | |
| 9,404,369 B2 * | 8/2016 | Propheter-Hinckley | B23P 15/02 |
| 9,611,745 B1 * | 4/2017 | Jones | F01D 5/189 |
| 2009/0060715 A1 * | 3/2009 | Kopmels | F01D 5/187 415/115 |
| 2010/0054915 A1 * | 3/2010 | Devore | F01D 5/189 415/116 |
| 2010/0329847 A1 | 12/2010 | Yamashita et al. | |
| 2012/0219402 A1 * | 8/2012 | Harding | F01D 5/189 415/115 |
| 2013/0039774 A1 * | 2/2013 | Viens | F01D 5/147 416/226 |
| 2013/0243587 A1 | 9/2013 | Yamashita et al. | |
| 2014/0093379 A1 * | 4/2014 | Tibbott | F01D 5/189 416/224 |
| 2016/0194978 A1 * | 7/2016 | Memmen | F01D 25/12 415/115 |

FOREIGN PATENT DOCUMENTS

| | | | |
|---|---|---|---|
| JP | 2012246786 A | 12/2012 | |
| JP | 2015132176 A | 7/2013 | |

\* cited by examiner

EXPANSION SEALS FOR AIRFOILS

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. To provide necessary cooling, ribs or other internal structures may be formed within the airfoils during the casting or other manufacturing process. Such structures may increase the weight of the airfoil. Reducing the weight of airfoils may be advantageous.

BRIEF DESCRIPTION

According to some embodiments, airfoils for gas turbine engines are provided. The airfoils include an airfoil body radially extending from a first end to a second end and axially extending from a leading edge to a trailing edge, the airfoil body defining an airfoil cavity therein, the airfoil cavity defined by a cavity wall having at least one smooth portion and at least one expansion seal installed within the airfoil cavity, the at least one expansion seal dividing the airfoil cavity into at least a first sub-cavity and a second sub-cavity. The at least one expansion seal engages with the smooth portion of the cavity wall by an expansion force that biases ends of the at least one expansion seal into contact with the smooth portion of the cavity wall.

In addition to one or more of the features described herein, or as an alternative, further embodiments of the airfoils may include that the ends of the at least one expansion seal are welded to the smooth portion of the cavity wall.

In addition to one or more of the features described herein, or as an alternative, further embodiments of the airfoils may include that the at least one expansion seal is arranged to divide the airfoil cavity from the first end to the second end, such that the first sub-cavity is separated from the second sub-cavity.

In addition to one or more of the features described herein, or as an alternative, further embodiments of the airfoils may include that the at least one expansion seal extends less than an entire radial length of the airfoil cavity such that the first sub-cavity is fluidly connected to the second sub-cavity.

In addition to one or more of the features described herein, or as an alternative, further embodiments of the airfoils may include that the at least one expansion seal comprises a first expansion seal and a second expansion seal, wherein the first and second expansion seals extend less than an entire radial length of the airfoil cavity and the first sub-cavity and the second sub-cavity form a portion of a serpentine flow path.

In addition to one or more of the features described herein, or as an alternative, further embodiments of the airfoils may include that the at least one expansion seal is formed from sheet metal.

In addition to one or more of the features described herein, or as an alternative, further embodiments of the airfoils may include that the at least one expansion seal is formed from an austenitic nickel-chromium-based superalloy, an austenitic nickel-based superalloy, or a nickel-molybdenum alloy.

In addition to one or more of the features described herein, or as an alternative, further embodiments of the airfoils may include that the sheet metal has a thickness of between 0.010 inches and 0.020 inches.

In addition to one or more of the features described herein, or as an alternative, further embodiments of the airfoils may include that the at least one expansion seal comprises at least one undulation.

In addition to one or more of the features described herein, or as an alternative, further embodiments of the airfoils may include that the at least one expansion seal comprises a first expansion seal and a second expansion seal, wherein each of the first and second expansion seals comprises at least one undulation.

In addition to one or more of the features described herein, or as an alternative, further embodiments of the airfoils may include that the first expansion seal comprises more undulations than the second expansion seal.

In addition to one or more of the features described herein, or as an alternative, further embodiments of the airfoils may include that the first expansion seal is positioned closer to the leading edge of the airfoil body than the second expansion seal, and the second expansion seal is positioned closer to the trailing edge of the airfoil body than the first expansion seal.

In addition to one or more of the features described herein, or as an alternative, further embodiments of the airfoils may include that the smooth portion extends over the entire cavity wall.

In addition to one or more of the features described herein, or as an alternative, further embodiments of the airfoils may include that the airfoil body is made of ceramic matrix composite.

According to some embodiments, methods of manufacturing airfoils for gas turbine engines are provided. The methods include installing at least one expansion seal within an airfoil cavity of an airfoil body, wherein the airfoil body radially extends from a first end to a second end and axially extend from a leading edge to a trailing edge, the airfoil body defining an airfoil cavity therein, the airfoil cavity defined by a smooth cavity wall. Installation of the at least one expansion seal includes applying a compression force to the at least one expansion seal, inserting the at least one expansion seal within the airfoil cavity, and releasing the compression force to allow the at least one expansion seal to expand into engagement with the smooth cavity wall of the airfoil body, thus dividing the airfoil cavity into at least a first sub-cavity and a second sub-cavity.

In addition to one or more of the features described herein, or as an alternative, further embodiments of the methods may include fixing ends of the at least one expansion seal to the smooth cavity wall.

In addition to one or more of the features described herein, or as an alternative, further embodiments of the methods may include that the fixing comprises welding or tacking.

In addition to one or more of the features described herein, or as an alternative, further embodiments of the methods may include that the at least one expansion seal is formed from an austenitic nickel-chromium-based superalloy, an austenitic nickel-based superalloy, or a nickel-molybdenum alloy.

In addition to one or more of the features described herein, or as an alternative, further embodiments of the methods may include that the at least one expansion seal comprises a first expansion seal and a second expansion seal, wherein each of the first and second expansion seals comprises at least one undulation, the first expansion seal comprising more undulations than the second expansion seal, the method further comprising positioning the first expansion seal closer to the leading edge of the airfoil body than the second expansion seal, and positioning the second expansion seal closer to the trailing edge of the airfoil body than the first expansion seal.

In addition to one or more of the features described herein, or as an alternative, further embodiments of the methods may include manufacturing the airfoil body from ceramic matrix composite.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
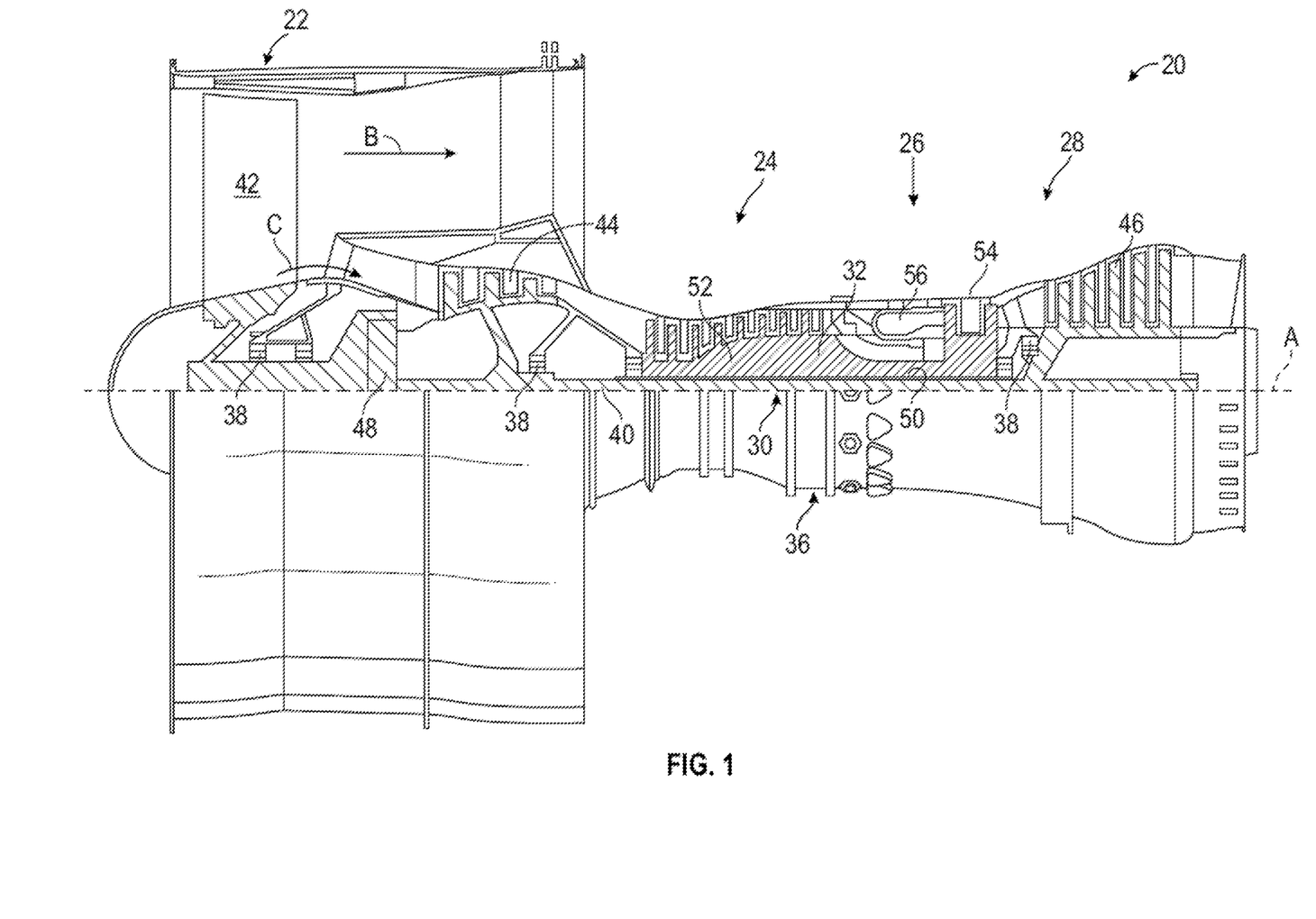
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
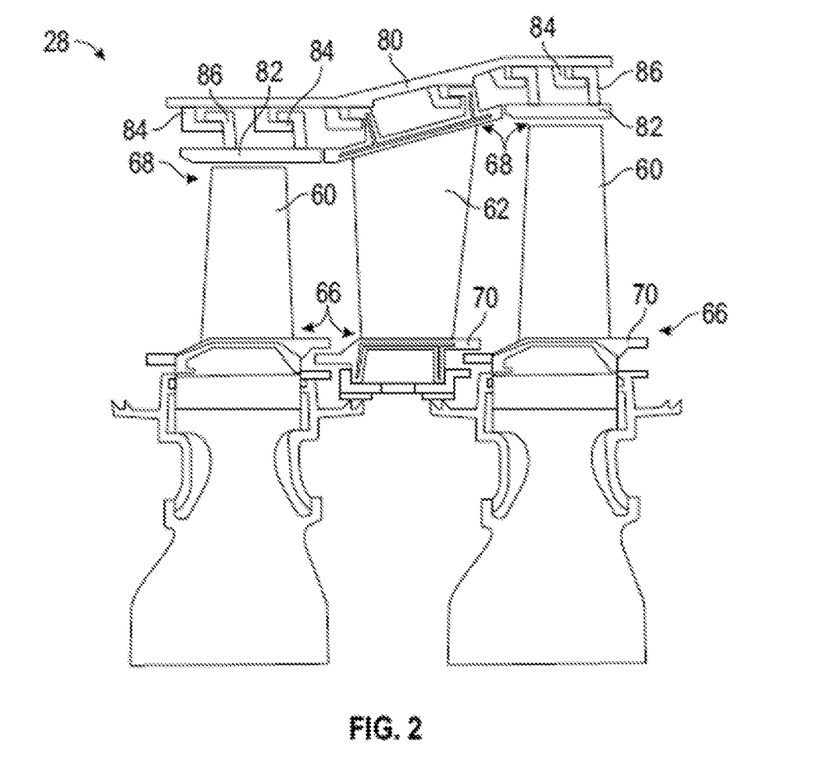
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes.

The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root or first end of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip or second end of the airfoil 60.

Figure 3:
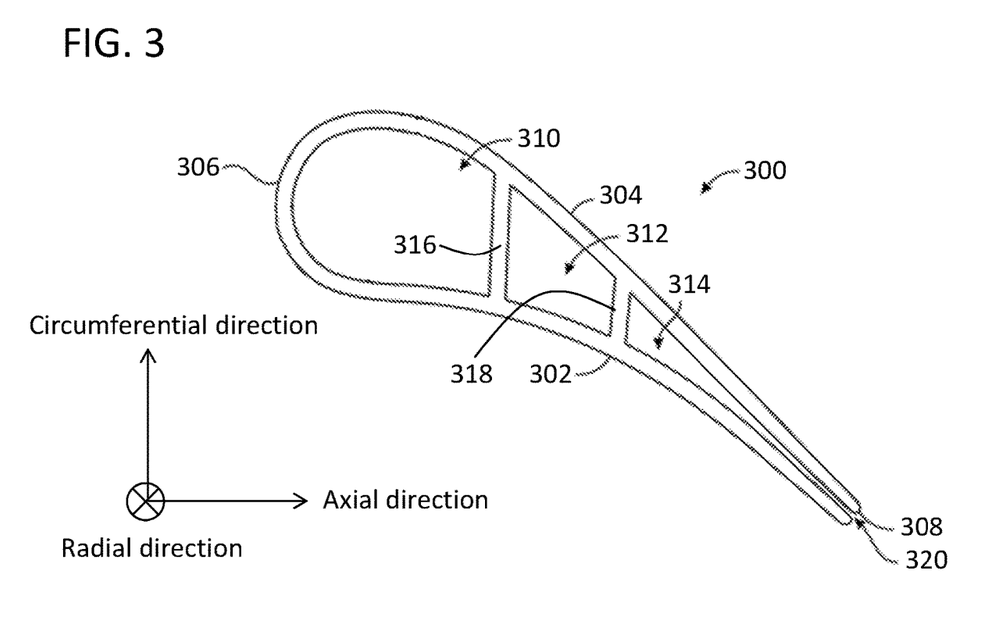
FIG. 3 is a partial cross-sectional view of an airfoil.

Turning now to FIG. 3, a schematic illustration of an airfoil 300 is shown. The airfoil 300 may be a blade or vane, such as that shown in FIG. 2 (blades 60, vanes 62). The airfoil 300 is a partially hollow, aerodynamic body including a pressure side 302, a suction side 304, a first end (e.g., root region, inner diameter, proximate a platform 70 as shown in FIG. 2, etc.), a second end (e.g., tip region, outer diameter, proximate a BOAS 82 as shown in FIG. 2, etc.), a leading edge 306, and a trailing edge 308. The airfoil 300 extends radially (into and out of the page of FIG. 3) from the first end to the second end. Further, the airfoil 300 extends in an axial direction from the leading edge 306 to the trailing edge 308. The directions and/or orientations described herein are made with respect to an engine axis when the airfoil 300 is installed in said engine (e.g., engine central longitudinal axis A shown in FIG. 1). Accordingly, as used herein, the term "radial" refers to radial with respect to an engine axis.

The pressure side 302 is disposed opposite the suction side 304. The pressure side 302 and the suction side 304 each extend radially from the first end to the second end of the airfoil. The pressure side 302 and the suction side 304 each extend generally axially (e.g., with respect to the engine axis) between the leading edge 306 and the trailing edge 308. Each of the first end and the second end of the airfoil extend from the leading edge 306 to the trailing edge 308 opposite each other at ends of the airfoil body in the radial direction. As such, the first end defines an inner radial end of the airfoil body and the second end defines an outer radial end of the airfoil body (relative to an engine axis). The airfoil 300 may be a blade or vane, and have various other features associated with such configurations, e.g., platforms, tip surfaces, etc.

As shown in FIG. 3, illustrating a cross-sectional view of the airfoil 300, the airfoil 300 defines or includes a plurality of internal cavities to enable cooling of the airfoil 300. For example, as shown, the airfoil 60 includes a plurality of cooling cavities 310, 312, 314. The cooling cavities 310, 312, 314 define a serpentine flow cavity as will be appreciated by those of skill in the art. A first cooling cavity 310 is located proximate the leading edge 306, a second cooling cavity 312 is located axially toward the trailing edge from the first cooling cavity 310 (i.e., "aftward") and is separated by a first rib 316. The third cooling cavity 314 is located aftward of the second cooling cavity 312 and is separated from the second cooling cavity 312 by a second rib 318. The ribs 316, 318 are cast ribs that are integrally formed with the body of the airfoil 300 and extend circumferentially between the pressure side 302 and the suction side 302, and separate the cooling cavities 310, 312, 314. Although described as separating the cooling cavities 310, 312, 314, those of skill in the art will appreciate that the ribs 316, 318 may not extend completely from a first end to a second end, and thus the various cooling cavities 310, 312, 314 may be fluidly connected to form a serpentine flow path through the airfoil 300.

Air flowing through the cooling cavities 310, 312, 314 may exit the trailing edge 308 of the airfoil 300 through a trailing edge slot 320. The most aftward (aft-flowing) cooling cavity 314 defines a serpentine trailing edge cavity that fluidly connects to the trailing edge slot 320 that is formed at the trailing edge 308. In one non-limiting example, the first cooling cavity 310 is arranged for flow in a first direction (e.g., an up pass cooling flow), the second cooling cavity 312 is arranged for flow in a second direction (e.g., a down pass cooling flow), and the third cooling cavity 314 is arranged for flow in the first direction and/or a third direction (e.g., an up pass cooling flow that exits the airfoil 300 through the trailing edge slot 320). Although described with a single example internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

As noted above, the ribs are cast in with the body of the airfoil. Such casting of the ribs to separate the airfoil cooling cavities may increase the weight of the airfoil. Typical thickness of cast ribs is approximately 0.030 inches. However, engine weight requirements are trending downward and thus reductions in weight of any components within an engine are advantageous. Further, life requirements are trending upward, meaning that life cycle of components of the engines is increasing and thus part-life increases are advantageous. Moreover, there is a trend to be able to reduce time to create hardware such that components can be readily produced. In view of this, embodiments of the present disclosure are directed to airfoils having reduced weight, increased part-life, and reduced production costs and/or production times.

That is, embodiments of the present disclosure are directed to hollow body airfoils with smooth or uninterrupted interior areas and/or surfaces and expansion seals that are installed to operate as ribs within the airfoil (e.g., divide a central cavity into multiple sub-cavities, such as a serpentine flow path). The expansion seals can be compressed and inserted into airfoil cavities to serve as ribs. The biasing nature of the expansion seals allows the expansion seals to be compressed and inserted into the airfoil, resulting in a tight fit against a smooth, interior area of an airfoil wall during assembly. In some embodiments, the inner-diameter (e.g., proximate the first end) and/or the outer-diameter (e.g., proximate the second end) ends of the expansion seals can be tack welded into place. The biasing nature of the expansion seals also allows the expansion seals to expand as the airfoil expands during engine operation, resulting in a tight fit throughout engine operation. Further, in some embodiments, depending on the cooling scheme, pressure differentials between two sub-cavities and the wedge shape of the airfoil can help keep the expansion seals in place and tight against the airfoil wall during engine operation. In some embodiments, the expansion seals are biased or spring-loaded to enable engagement between a portion of the expansion seal and a surface of the airfoil.

As used herein, a "smooth" surface on the interior of the airfoil is a surface that does not include structures or features arranged to engage with inserts/rib structures. Such smooth surfaces further do not include flow or thermal transfer augmentation features (e.g., trip strips, etc.), but rather are smooth to enable a secure, sealing engagement with an end of an expansion seal. That is, a smooth, uninterrupted surface area of the interior cavity walls of the airfoil allows for unimpeded movement and placement of an expansion seal within an airfoil, as discussed herein. However, in some embodiments, a "smooth" surface, as used herein, does not exclude heat transfer augmentation features from being present on other interior surfaces of the airfoil cavity walls, such as trip strips within flow channels/cavities/sub-cavities that are defined by the inserted expansion seals.

Figure 4A:
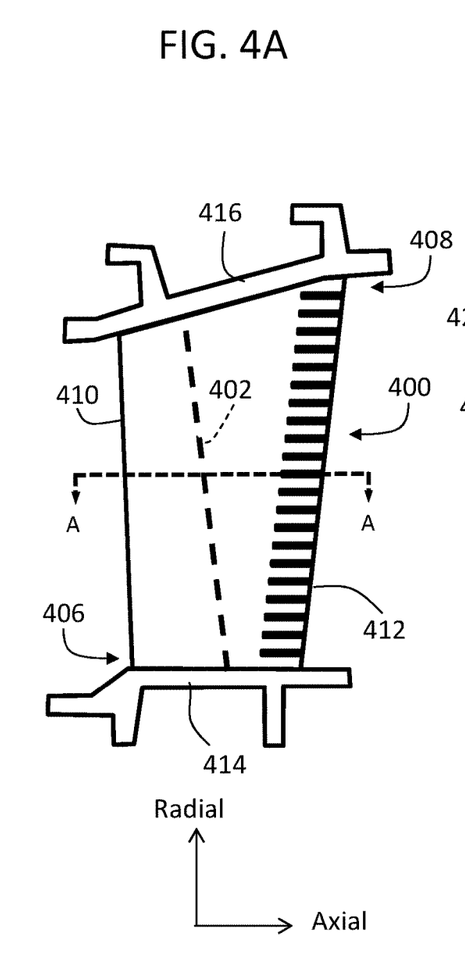
FIG. 4A is a side elevation view of an airfoil in accordance with an embodiment of the present disclosure with an expansion seal installed therein.
Figures 4B, 4C:
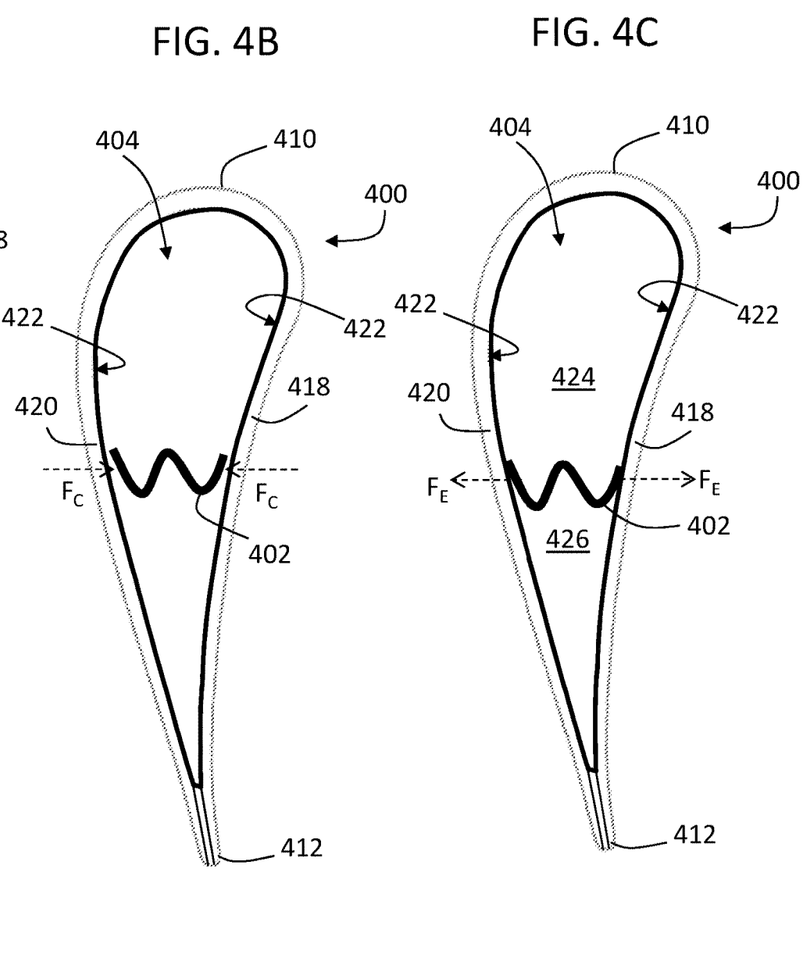
FIG. 4B is a cross-sectional illustration of the airfoil of FIG. 4A as viewed along the line A-A thereof, illustrating a part of an installation process of the expansion seal.
FIG. 4C is the same cross-sectional view as that of FIG. 4B and illustrating the expansion seal as installed within the airfoil.

Turning now to FIGS. 4A-4C, schematic illustrations of an airfoil 400 in accordance with an embodiment of the present disclosure are shown. FIG. 4A is a side elevation view of the airfoil 400, FIG. 4B is a cross-sectional illustration as viewed along the line A-A shown in FIG. 4A showing a hollow, single-cavity structure of the airfoil 400, and FIG. 4C is a cross-sectional illustration as viewed along the line A-A shown in FIG. 4A with an expansion seal 402 installed within an airfoil cavity 404.

As shown in FIG. 4A, the airfoil 400 extends radially from a first end 406 (or inner diameter) to a second end 408 (or outer diameter), as shown and described above. The airfoil 400 further extends in a substantially axially direction from a leading edge 410 to a trailing edge 412. As shown, the airfoil 400 is positioned between a platform 414 at the first end 406 and an air seal 416 at the second end 408. The airfoil 400 includes a pressure side 418 and a suction side 420, with the airfoil cavity 404 therebetween and extending, in this embodiment, from the leading edge 410 to the trailing edge 412. As such, the airfoil 400 is a hollow body airfoil with a single, unitary cavity formed therein. The airfoil cavity 404 is defined by a cavity wall 422. In some embodiments, the airfoil cavity 404 extends radially from the first end 406 to the second end 408 of the airfoil 400, and in other embodiments, the airfoil cavity 404 may only extend partway between the first end 406 and the second end 408 of the airfoil 400.

By utilizing one or more expansion seals 402 as ribs in the airfoil cavity 404, the airfoil cavity 404 can be divided into multiple sub-cavities 424, 426, as shown. As shown, the expansion seal 402 can be positioned within the airfoil 400 to divide the airfoil cavity 404 into a first sub-cavity 424 and a second sub-cavity 426. In some embodiments, the expansion seal 402 can substantially fluidly separate the first sub-cavity 424 from the second sub-cavity 426 along a radial length of the expansion seal 402. As shown, in FIG. 4A, the expansion seal 402 may extend substantially along the entire radial extent of the airfoil 400 (i.e., from first end 406 to second end 408), and thus divide the airfoil cavity 404 into two substantially independent cavities. In some embodiments, the expansion seal 402 may be arranged such that a small percentage or amount of air may bleed between the two sub-cavities 424, 426.

The expansion seal 402 is an insert that is placed within the airfoil cavity 404 and then expands to engage with the cavity wall 422. The expansion seal 402 may be spring-loaded or biased such that the expansion seal 402 is at least partially compressed and positioned at a specific location within the airfoil cavity 404. The compression force is released, and the expansion seal 402 expands outward such that the expansion seal 402 engages with the cavity wall 422 and fixes the expansion seal 402 in place within the airfoil 400.

For example, with reference to FIGS. 4B-4C, the expansion seal 402 is shown in a compressed state in FIG. 4B and an expanded state in FIG. 4C. As shown, to insert the expansion seal 402 into the airfoil cavity 404, the expansion seal 402 may be compressed by a compression force $F_C$. The compressed expansion seal 402 can then be moved or positioned at a desired location within the airfoil cavity 404. Upon release or removal of the compression force $F_C$, the natural tendency of the expansion seal 402 will be to expand with an expansion force $F_E$, thus applying an engaging force with the cavity wall 422.

The expansion seals of the present disclosure can be made from 0.010 inch to 0.020 inch sheet metal, which is thinner and lighter than the typical 0.030 inch cast ribs. The expansion seals may be formed from sheet metal materials such as austenitic nickel-chromium-based superalloys, austenitic nickel-based superalloys, nickel-molybdenum alloys, and/or other metals, alloys, superalloys, etc. as will be appreciated by those of skill in the art. Such materials may have lower densities than cast, single crystal materials (e.g., typical airfoil manufacturing techniques that include a formed/integral rib). Further, advantageously, because the expansion seals are separate pieces, the casting process for an airfoil is simplified, resulting in cheaper castings. Further, because the expansion seals are separate components from the airfoil itself, this enables quick changes to the cooling scheme by utilizing existing casting processes and adding or moving expansion seals within the airfoil cavity. Moreover, because the expansion is not attached to or part of the airfoil wall, stresses are reduced by eliminating thermal differences (e.g., expansion/contractions) between cold ribs and hot exterior walls of the airfoil.

Figure 5:
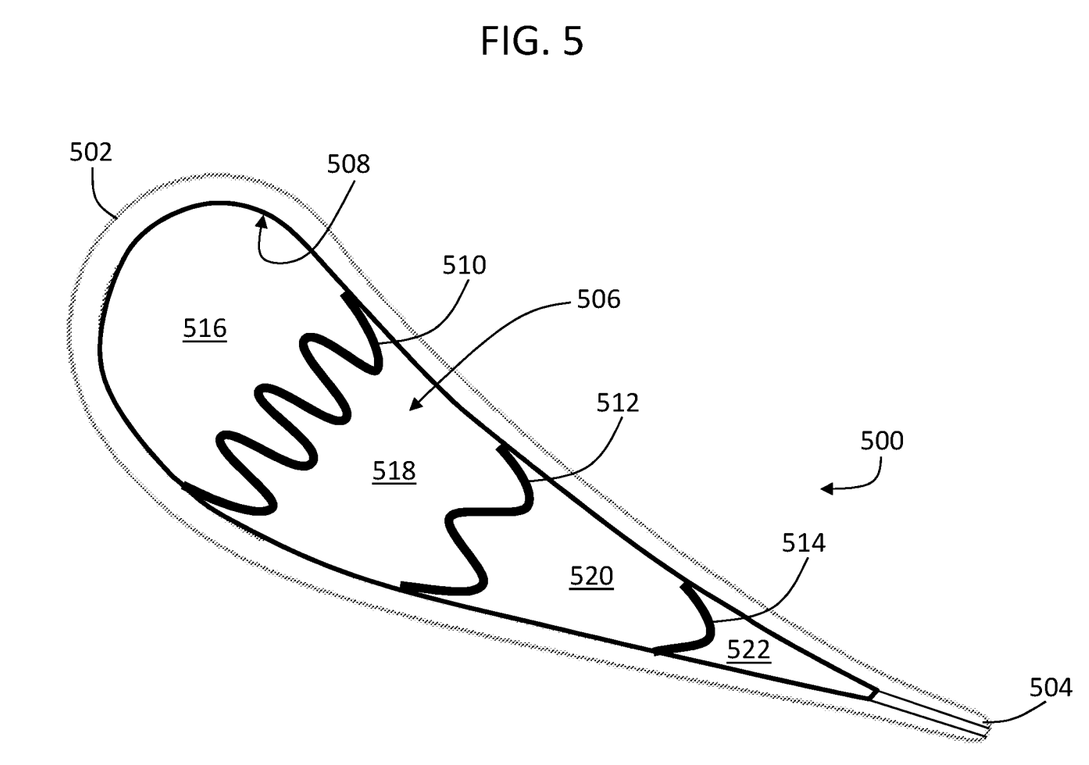
FIG. 5 is a cross-sectional illustration of an airfoil in accordance with an embodiment of the present disclosure.

Turning now to FIG. 5, a schematic illustration of an airfoil 500 in accordance with an embodiment of the present disclosure is shown. As shown, the airfoil 500 is similar to that shown above, having a leading edge 502 and a trailing edge 504. The airfoil 500 defines an airfoil cavity 506 therein which is defined by a cavity wall 508. Installed within the airfoil cavity 506 are a plurality of expansion seals 510, 512, 514. The expansion seals 510, 512, 514 divide the airfoil cavity 506 into four sub-cavities (e.g., a first sub-cavity 516, a second sub-cavity 518, a third sub-cavity 520, and a fourth sub-cavity 522).

As schematically show, the expansion seals 510, 512, 514 each have different configurations, which is based, in part, on the location within the airfoil cavity 506 that the respective expansion seal 510, 512, 514 is placed. As shown, a first expansion seal 510 has four undulations which allows for extending across a wide portion of the airfoil cavity 506. A second expansion seal 512 has two undulations and expands across a narrower portion of the airfoil cavity 506. Finally, a third expansion seal 514 has a single undulation and spans an even narrower portion of the airfoil cavity 506.

In this embodiment, the sub-cavities 516, 518, 520, 522 may form a serpentine flow path within the airfoil 500. As such, the sub-cavities 516, 518, 520, 522 (or a subset thereof) may be fluidly connected. In such example, the fluid connection between adjacent sub-cavities may occur toward the first end or the second end of the airfoil 500 to thus form a serpentine flow path. Although shown with three expansion seals and specific numbers of undulations, those of skill in the art will appreciate that any number of expansion seals and number of undulations may be employed in various embodiments of the present disclosure.

Figure 6A:
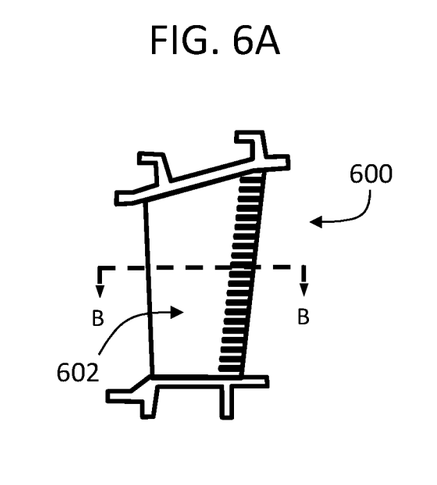
FIG. 6A is a side elevation illustration of an airfoil in accordance with an embodiment of the present disclosure.
Figure 6B:
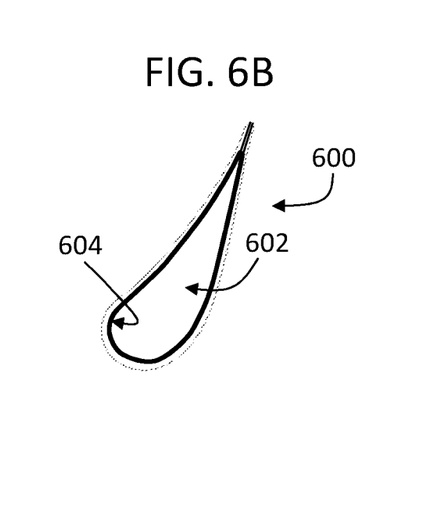
FIG. 6B is a cross-sectional illustration of the airfoil of FIG. 6A viewed along the line B-B thereof.

Turning now to FIGS. 6A-6B, schematic illustrations of an airfoil 600 in accordance with an embodiment of the present disclosure is shown. FIG. 6A is a side, elevation illustration of the airfoil 600 having a single airfoil cavity 602 defined therein and FIG. 6B is a cross-sectional illustration as viewed along the line B-B. The airfoil 600 includes a cavity wall 604 having smooth portions that do not include any features that may obstruct flow through the airfoil cavity 602 or divide the airfoil cavity 602 into multiple cavities.

As noted, some portions of the cavity wall 604 are smooth, although in some embodiments the entire cavity wall 604 may be smooth. According to embodiments described herein, a smooth cavity wall 604 enables placement and engagement of one or more expansion seals at any locations within the airfoil cavity 602. That is, because the walls are smooth, there will be no obstructions to defining and arranging sub-cavities within the airfoil 600. The smooth-walled cavity wall 604 may be in contrast to alternative arrangements of insertable ribs that may include grooves, channels, or other features to enable positioning an insertable rib within an airfoil. Further, the smooth walled arrangement allows for ease of tacking, welding, or other fastening of one or more expansion seals to be installed within an airfoil. For example, as discussed below with respect to FIGS. 7A-8B, different arrangements (numbers, configurations, sizes, etc.) of expansion seals can be positioned within an airfoil cavity.

Figure 7A:
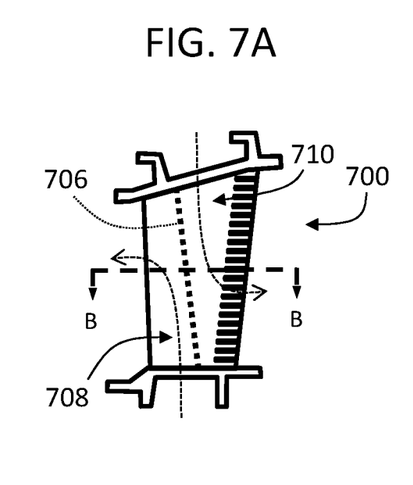
FIG. 7A is a side elevation illustration of an airfoil in accordance with an embodiment of the present disclosure having a single expansion seal installed therein.
Figure 7B:
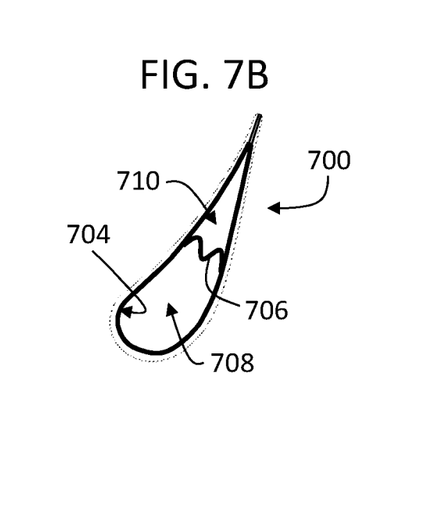
FIG. 7B is a cross-sectional illustration of the airfoil of FIG. 6A viewed along the line B-B thereof.

Turning now to FIGS. 7A-7B, schematic illustrations of an airfoil 700 in accordance with an embodiment of the present disclosure is shown. FIG. 7A is a side, elevation illustration of the airfoil 700 having a single airfoil cavity defined therein and FIG. 7B is a cross-sectional illustration as viewed along the line B-B. The airfoil 700 includes a smooth cavity wall 704 that does not include any features that may obstruct flow through the airfoil cavity or divide the airfoil cavity into multiple cavities. However, in this embodiment, a single expansion seal 706 has been inserted into the airfoil cavity to divide the interior of the airfoil 700 into a first sub-cavity 708 and a second sub-cavity 710. The expansion seal 706 is shown engaging with the smooth cavity wall 704. The location of the expansion seal 706 within the airfoil cavity may be based, in part, on a length of the expansion seal 706 and/or the amount of compression and/or expansion of the expansion seal 706 that is desired for a particular application.

Figure 8A:
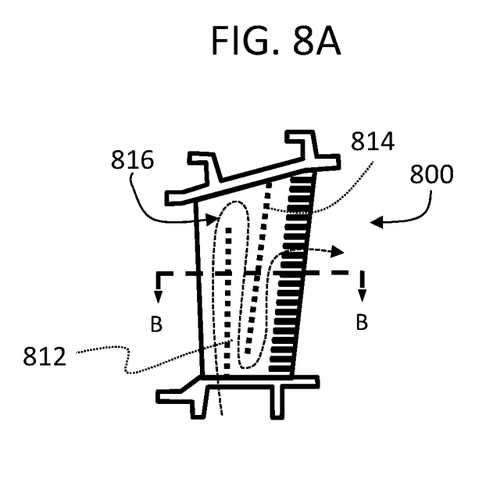
FIG. 8A is a side elevation illustration of an airfoil in accordance with an embodiment of the present disclosure having two expansion seals installed therein.
Figure 8B:
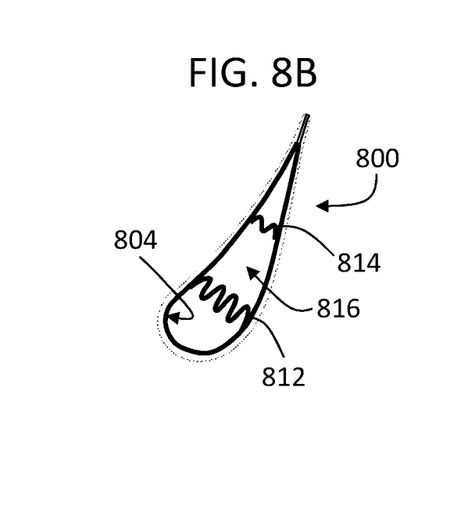
FIG. 8B is a cross-sectional illustration of the airfoil of FIG. 6A viewed along the line B-B thereof.

Turning now to FIGS. 8A-8B, schematic illustrations of an airfoil 800 in accordance with an embodiment of the present disclosure is shown. FIG. 8A is a side, elevation illustration of the airfoil 800 having a single airfoil cavity defined therein and FIG. 8B is a cross-sectional illustration as viewed along the line B-B. The airfoil 800 includes a smooth cavity wall 804 that does not include any features that may obstruct flow through the airfoil cavity or divide the airfoil cavity into multiple cavities. In this embodiment, two expansion seals 812, 814 are shown inserted into the airfoil cavity to divide the interior of the airfoil 800 into a serpentine flow cavity 816. The expansion seals 812, 814 do not extend the full radial length of the airfoil 800, but rather stop short of a full radial extension. As such, the serpentine flow cavity 816 is formed within the airfoil 800. The expansion seals 812, 814 are shown engaging with the smooth cavity wall 804. The location of the expansion seals 812, 814 within the airfoil cavity may be based, in part, on a length of the expansion seals 812, 814 and/or the amount of compression and/or expansion of the expansion seals 812, 814 that is desired for a particular application.

Although FIGS. 7A-7B illustrate the use of a single expansion seal and FIGS. 8A-8B illustrate the use of two expansion seals, those of skill in the art will appreciate that any number of expansion seals may be installed within an airfoil cavity. Further, although the single-seal arrangement of FIGS. 7A-7B illustrates a full, radial extension of the expansion seal within the airfoil and the dual-seal arrangement of FIGS. 8A-8B illustrates partial radial extension of the expansion seals within the airfoil, various other arrangements and/or combinations of arrangements may be employed without departing from the scope of the present disclosure.

Figure 9A:
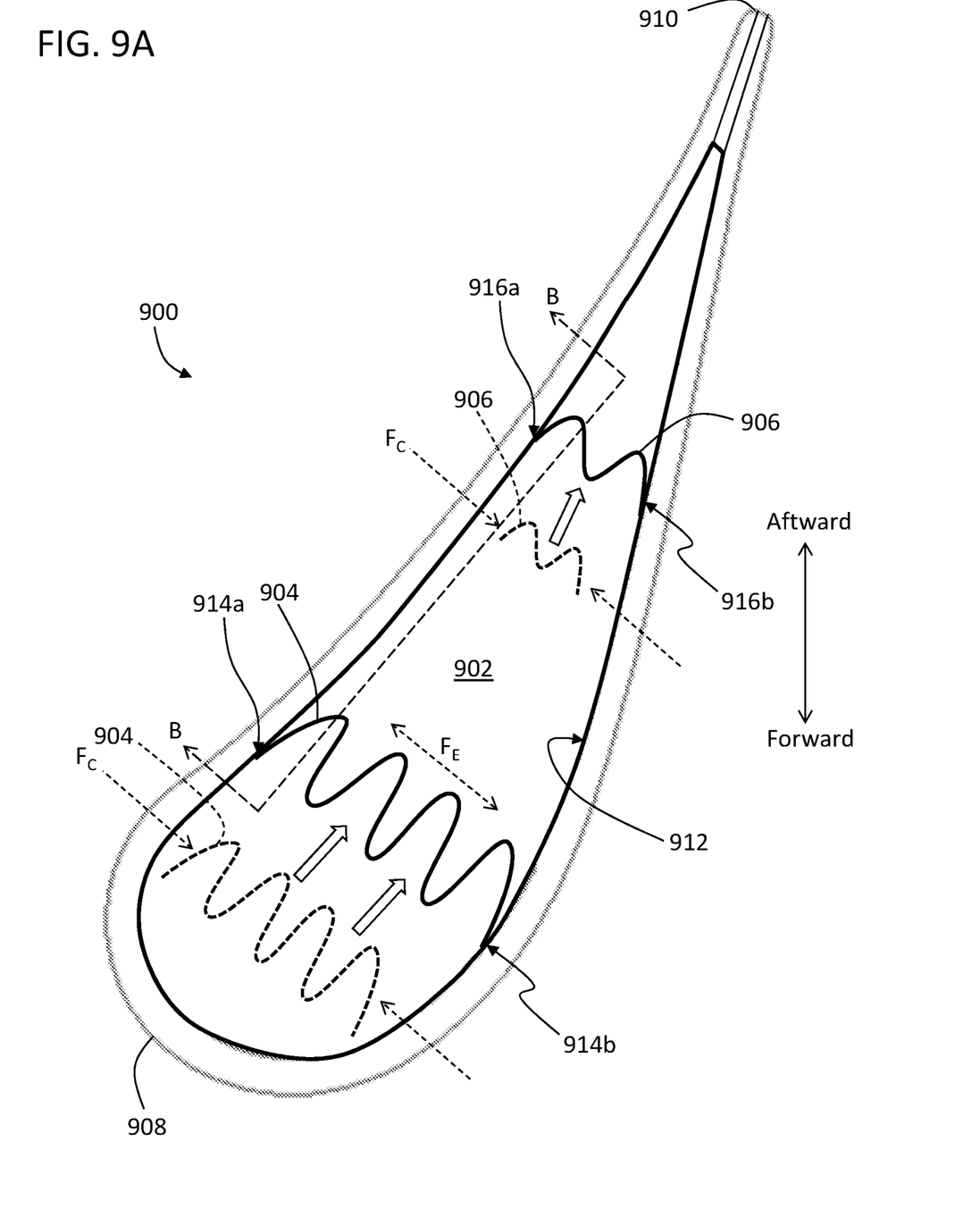
FIG. 9A is a cross-sectional view of an installation process in accordance with an embodiment of the present disclosure.
Figure 9B:
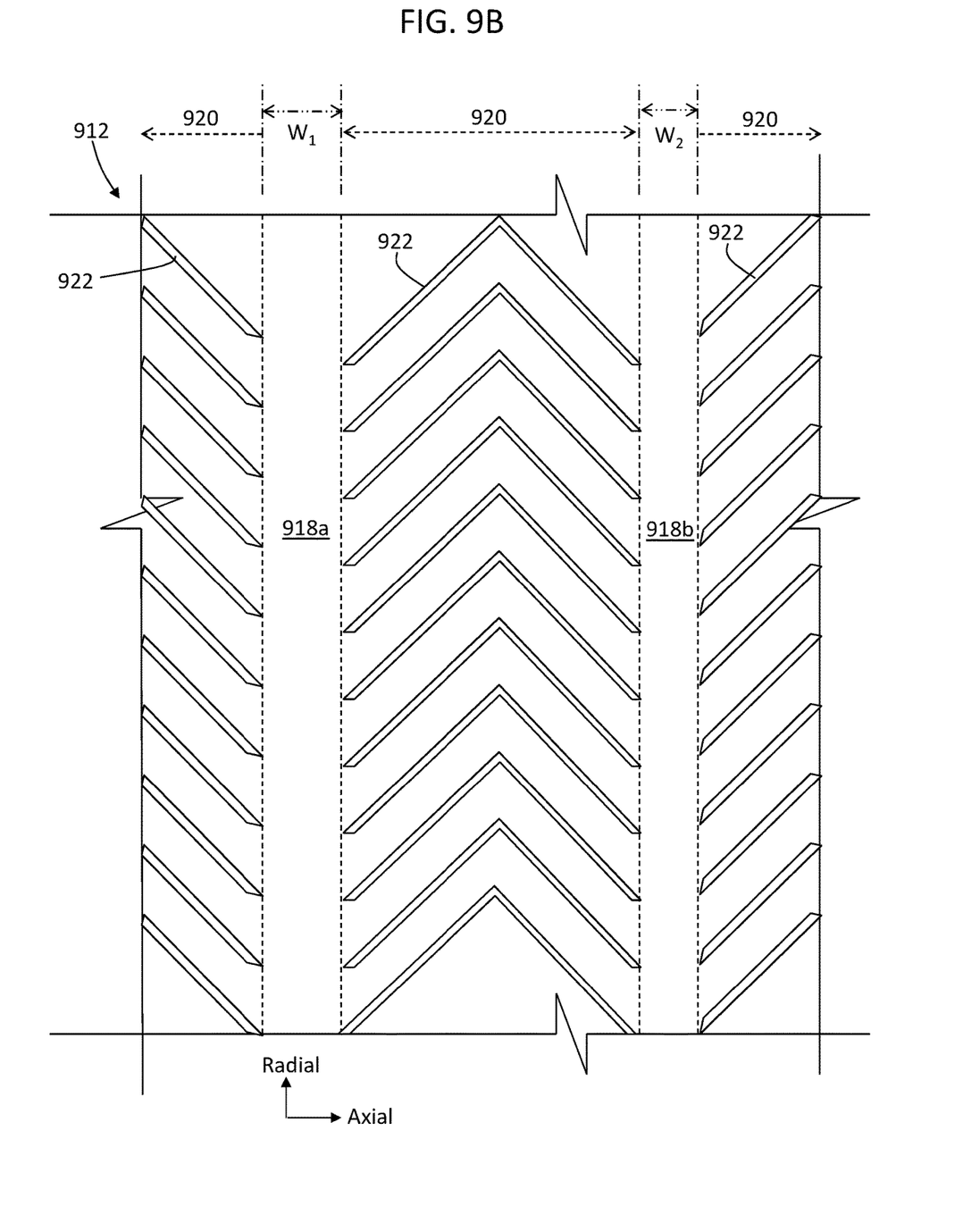
FIG. 9B is an elevation view of a cavity wall of the airfoil of FIG. 9A as viewed along the line B-B.

Turning now to FIG. 9A, a schematic illustration of an installation process in accordance with an embodiment of the present disclosure is shown. In the present illustration, an airfoil 900 having an airfoil cavity 902 is divided into having multiple sub-cavities by the installation of a first expansion seal 904 and a second expansion seal 906. The airfoil 900 extends in a generally aftward (axial) direction from a leading edge 908 to a trailing edge 910. The airfoil cavity 902 is defined by a cavity wall 912 having smooth portions 918a, 918b. FIG. 9B illustrates an elevation illustration of the interior, cavity wall 912 of the airfoil, illustrating the smooth portions 918a, 918b and augmentation portions 920 having augmentation features 922 (e.g., flow or thermal transfer augmentation features).

As shown in FIG. 9A, the first expansion seal 904 is in a first or compressed state (shown in dashed lines) and is positioned within the airfoil cavity 902. The first expansion seal 904 is compressed by a compression force $F_C$ to reduce a length or size of the first expansion seal 904 and to enable installation within the airfoil cavity 902. The first expansion seal 904 is then moved aftward to the location of the first smooth portion 918a for installation. The compression force $F_C$ is then released and the first expansion seal 904 will expand outward by a natural expansion force $F_E$ of the first expansion seal 904. Upon expansion, ends 914a, 914b of the first expansion seal 904 will contact the smooth portions of the cavity wall 912 (e.g., a first smooth portion 918a shown in FIG. 9B) and engage therewith. The expansion of the first expansion seal 904 may cause an interference fit or pressed engagement between the ends 914a, 914b of the first expansion seal 904 and the cavity wall 912 at the smooth portion 918a. Subsequently, welding, tacking, or other attachment and/or fixing operation can be employed to fixedly attach the first expansion seal 904 to the cavity wall 912. In some embodiments, adhesives or other chemical and/or mechanical mechanism can be used to fix the first expansion seal 904 in place. As shown, the first expansion seal 904 has four undulations, which may be used to enable installation at a specific location within the airfoil cavity 902 (e.g., the number of undulations may dictate the length of the expansion seal and thus where it may fit within the airfoil).

Similarly, the second expansion seal 906 is in a first or compressed state (shown in dashed lines) and is positioned within the airfoil cavity 902. The second expansion seal 906 is compressed by a compression force $F_C$ to reduce a length or size of the second expansion seal 906 and to enable installation within the airfoil cavity 902. The second expansion seal 906 is then moved aftward to a desired location for installation. The compression force $F_C$ is then released and the second expansion seal 906 will expand outward by a natural expansion force $F_E$ of the second expansion seal 906. Upon expansion, ends 916a, 916b of the second expansion seal 906 will contact second smooth portions 918b of the cavity wall 912 and engage therewith. The expansion of the second expansion seal 906 may cause an interference fit or pressed engagement between the ends 916a, 916b of the second expansion seal 906 and the smooth portion 918b of the cavity wall 912. Subsequently, welding, tacking, or other attachment and/or fixing operation can be employed to fixedly attach the second expansion seal 906 to the smooth cavity wall 912. In some embodiments, adhesives or other chemical and/or mechanical mechanism can be used to fix the second expansion seal 906 in place. As shown, the second expansion seal 906 has two undulations, which may be used to enable installation at a specific location within the airfoil cavity 902 (e.g., the number of undulations may dictate the length of the expansion seal and thus where it may fit within the airfoil).

As schematically shown in FIG. 9B, the smooth portions 918a, 918b of the cavity wall 912 do not extend over the entire surface of the cavity wall 912, but rather are located at discrete or predetermined locations. The smooth portions 918a, 918b of the cavity wall 912 can have thicknesses $W_1$, $W_2$, respectively. The thicknesses $W_1$, $W_2$ can be defined to allow for installation of the expansion seals 904, 906 at locations within the airfoil 900. The thicknesses $W_1$, $W_2$ can be set to have a predetermined thickness to enable variable placement of the expansion seals 904, 906 along the cavity wall 912.

Additionally, as shown, the cavity 912 may include augmentation portions 920 located along the cavity wall 912 at locations not occupied by the smooth portions 918a, 918b. The augmentation portions 920 can include trip strips 922, as shown, or may include other flow augmentation and/or thermal transfer augmentation features, including, but not limited to, film holes, ribs, etc.

Typically, the smooth portions 918a, 918b will extend in generally radial directions from the first end to the second end of the airfoil (whether full extend or only partial extent). The augmentation portions 920 may thus occupy the rest of the cavity wall 912 in a predetermined pattern to achieved desired cooling flow and/or thermal transfer within the airfoil 900.

In some embodiments, as shown and described above, the entire cavity wall may be smooth and thus lack any features that may interfere with installation of one or more expansion seals. In such embodiments, the expansion seal(s) may be installed at any desired location within the airfoil to form any desirable sub-cavity configuration. In embodiments that include augmentation portions, the augmentation portions may be arranged such that installation of the expansion seals thereon is not possible or not effective (e.g., the expansion seals may not be able to sealingly engage with the cavity wall at the location of the augmentation portions).

Advantageously, embodiments provided herein are directed to expansion seals that can be installed within an airfoil cavity to divide the airfoil cavity into multiple sub-cavities. In some embodiments, the sub-cavities may be fluidly isolated from each other, in other embodiments the sub-cavities may be fluidly connected (e.g., serpentine flow path), and still further, in some embodiments, bleed flow may occur between adjacent sub-cavities due to an imperfect sealing (or completely lack of attachment) between an end of an expansion seal and a smooth cavity wall of an airfoil cavity. The expansion seals of the present disclosure operate to replace traditional cast ribs within airfoils.

Although shown here with a single, unitary or continuous airfoil cavity within the airfoils, embodiments described herein are not so limited. That is, in some embodiments, an airfoil can be manufactured with one or more integral or cast ribs that divide the airfoil into multiple airfoil cavities. Expansion seals of the present disclosure can then be installed in one or more of the various multiple airfoil cavities to sub-divide the airfoil cavities as shown and described herein. Thus, although illustrations herein show an airfoil with an airfoil cavity that extends from the leading edge to the trailing edge, not all airfoils that may employ embodiments of the expansion seals are so arranged and may have multiple airfoil cavities that are subsequently divided by inserted expansion seals.

Advantageously, the expansion seals of the present disclosure can be used to reduce part-weight of the airfoil by eliminating traditional cast ribs. For example, as described above, the expansion seals of the present disclosure can be made from 0.010 inch to 0.020 inch sheet metal, which is thinner and lighter than the typical 0.030 inch cast ribs. Further, the material of the expansion seals of the present disclosure can be different from the material of the airfoil itself, enabling further weight reductions. For example, the sheet metal materials such as austenitic nickel-chromium-based superalloys, austenitic nickel-based superalloys, nickel-molybdenum alloys, and/or other metals, alloys, superalloys, etc. that have lower densities than cast single crystal materials that are used in typical airfoils/airfoil ribs. Moreover, because the expansion seals are separate pieces that are installed into an airfoil at desired locations, the casting of the airfoil becomes much simpler, resulting in cheaper castings. This also enables quick changes to the cooling scheme by utilizing the existing casting (with a specific uniform internal cavity structure) and adding, removing, or moving expansion seals to achieve a desired cooling scheme. Further, because the expansion is not attached to the airfoil wall, in all embodiments, stresses are reduced by eliminating the thermal fight between traditional cold ribs and hot exterior airfoil walls.

Advantageously, embodiments provided herein may be implemented with ceramic matrix composite airfoils. Such manufacturing techniques for airfoils may benefit from embodiments disclosed herein because internal walls/ribs may not be required to be formed during a lay-up process. That is, advantageously, a relatively simple airfoil body may be formed using ceramic matrix composites with a hollow interior cavity that can be divided into sub-cavities after formation using expansion seals as shown and described herein.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
    an airfoil body radially extending from a first end to a second end and axially extending from a leading edge to a trailing edge, the airfoil body defining an airfoil cavity therein, the airfoil cavity defined by a cavity wall having at least one smooth portion; and
    at least one expansion seal installed within the airfoil cavity, the at least one expansion seal dividing the airfoil cavity into at least a first sub-cavity and a second sub-cavity,
    wherein the at least one expansion seal engages with the smooth portion of the cavity wall by an expansion force that biases ends of the at least one expansion seal into contact with the smooth portion of the cavity wall,
    wherein the at least one smooth portion of the cavity wall is a portion of an interior wall of the airfoil body that is uninterrupted and does not include structures or features arranged to engage with the at least one expansion seal, and
    wherein the at least one expansion seal is arranged to divide the airfoil cavity extending from the first end to the second end, such that the first sub-cavity is fluidly separated from the second sub-cavity.

2. The airfoil of claim 1, wherein the ends of the at least one expansion seal are welded to the smooth portion of the cavity wall.

3. The airfoil of claim 1, wherein the at least one expansion seal is formed from sheet metal.

4. The airfoil of claim 3, wherein the at least one expansion seal is formed from an austenitic nickel-chromium-based superalloy, an austenitic nickel-based superalloy, or a nickel-molybdenum alloy.

5. The airfoil of claim 3, wherein the sheet metal has a thickness of between 0.010 inches and 0.020 inches.

6. The airfoil of claim 1, wherein the at least one expansion seal comprises at least one undulation.

7. The airfoil of claim 1, wherein the at least one expansion seal comprises a first expansion seal and a second expansion seal, wherein each of the first and second expansion seals comprises at least one undulation.

8. The airfoil of claim 7, wherein the first expansion seal comprises more undulations than the second expansion seal.

9. The airfoil of claim 8, wherein the first expansion seal is positioned closer to the leading edge of the airfoil body than the second expansion seal, and the second expansion seal is positioned closer to the trailing edge of the airfoil body than the first expansion seal.

10. The airfoil of claim 1, wherein the smooth portion extends over the entire cavity wall.

11. The airfoil of claim 1, wherein the airfoil body is made of ceramic matrix composite.

12. A method of manufacturing airfoils for gas turbine engines, the method comprising:
    installing at least one expansion seal within an airfoil cavity of an airfoil body, wherein the airfoil body radially extends from a first end to a second end and axially extend from a leading edge to a trailing edge, the airfoil body defining an airfoil cavity therein, the airfoil cavity defined by a cavity wall having at least one smooth portion,
    wherein installation of the at least one expansion seal comprises:
    applying a compression force to the at least one expansion seal;
    inserting the at least one expansion seal within the airfoil cavity; and
    releasing the compression force to allow the at least one expansion seal to expand into engagement with the smooth cavity wall of the airfoil body, thus dividing the airfoil cavity into at least a first sub-cavity and a second sub-cavity, wherein the at least one expansion seal divides the airfoil cavity extending from the first end to the second end, such that the first sub-cavity is fluidly separated from the second sub-cavity,
    wherein the at least one smooth portion of the cavity wall defines a surface that is uninterrupted and does not include structures or features arranged to engage with the at least one expansion seal.

13. The method of claim 12, further comprising fixing ends of the at least one expansion seal to the smooth cavity wall.

14. The method of claim 13, wherein the fixing comprises welding or tacking.

15. The method of claim 12, wherein the at least one expansion seal is formed from an austenitic nickel-chromium-based superalloy, an austenitic nickel-based superalloy, or a nickel-molybdenum alloy.

16. The method of claim 12, wherein the at least one expansion seal comprises a first expansion seal and a second expansion seal, wherein each of the first and second expansion seals comprises at least one undulation, the first expansion seal comprising more undulations than the second expansion seal, the method further comprising positioning the first expansion seal closer to the leading edge of the airfoil body than the second expansion seal, and positioning the second expansion seal closer to the trailing edge of the airfoil body than the first expansion seal.

17. The method of claim 12, further comprising manufacturing the airfoil body from ceramic matrix composite.

* * * * *